(12) United States Patent
Duggal et al.

(10) Patent No.: US 10,142,159 B2
(45) Date of Patent: Nov. 27, 2018

(54) IP ADDRESS ALLOCATION

(71) Applicant: Benu Networks, Inc., Billerica, MA (US)

(72) Inventors: Rajendar Duggal, Lincoln, MA (US); Swarup Sahoo, Acton, MA (US); Rajat Ghai, Sandwich, MA (US)

(73) Assignee: BENU NETWORKS, INC., Billerica, MA (US)

( * ) Notice: Subject to any disclaimer, the term of this patent is extended or adjusted under 35 U.S.C. 154(b) by 219 days.

(21) Appl. No.: 13/966,629

(22) Filed: Aug. 14, 2013

(65) Prior Publication Data

US 2014/0052860 A1 Feb. 20, 2014

Related U.S. Application Data

(60) Provisional application No. 61/682,863, filed on Aug. 14, 2012.

(51) Int. Cl.
| | | |
|---|---|---|
| *G06F 15/173* | (2006.01) | |
| *H04L 12/24* | (2006.01) | |
| *H04L 29/12* | (2006.01) | |
| *H04L 29/06* | (2006.01) | |

(52) U.S. Cl.
CPC .......... *H04L 41/00* (2013.01); *H04L 61/2015* (2013.01); *H04L 61/2514* (2013.01); *H04L 63/0892* (2013.01); *H04L 61/203* (2013.01); *H04L 61/2061* (2013.01); *H04L 2463/141* (2013.01)

(58) Field of Classification Search
None
See application file for complete search history.

(56) References Cited

U.S. PATENT DOCUMENTS

| | | | |
|---|---|---|---|
| 5,159,592 A | 10/1992 | Perkins | |
| 6,654,360 B1 | 11/2003 | Abrol | |
| 6,697,864 B1 * | 2/2004 | Demirtjis | ............ H04L 63/0272 709/217 |
| 7,058,022 B1 * | 6/2006 | Carolan | .............. H04L 12/2801 370/254 |
| 7,792,942 B1 * | 9/2010 | Regan | ............... H04L 29/12273 370/254 |

(Continued)

FOREIGN PATENT DOCUMENTS

EP 1619906 B1 8/2007

OTHER PUBLICATIONS

International Search Report and Written Opinion Issued by the U.S. Patent and Trademark Office as International Searching Authority for International Application No. PCT/US13/54934 dated Mar. 18, 2014 (4 pgs.).

*Primary Examiner* — Dhairya A Patel
(74) *Attorney, Agent, or Firm* — Wilmer Cutler Pickering Hale and Dorr LLP

(57) ABSTRACT

Systems and methods are described for IP Address allocation. A computerized method includes receiving at a wireless access gateway a request from a subscriber to connect to a network, allocating a first IP address to the subscriber from a first pool of IP addresses at the wireless access gateway, and assigning a second IP address to the subscriber from a second pool of IP addresses at the wireless access gateway when the subscriber requests a network service.

21 Claims, 6 Drawing Sheets

(56) References Cited

U.S. PATENT DOCUMENTS

| | | | | |
|---|---|---|---|---|
| 8,340,625 B1* | 12/2012 | Johnson | ................ | H04L 63/107 370/242 |
| 8,375,109 B1* | 2/2013 | Lange | ................ | H04L 61/2015 709/221 |
| 8,892,724 B1* | 11/2014 | Bertz | ................ | H04W 8/26 709/203 |
| 2003/0115345 A1 | 6/2003 | Chien et al. | | |
| 2003/0156537 A1 | 8/2003 | Soulhi et al. | | |
| 2005/0053063 A1 | 3/2005 | Madhavan | | |
| 2005/0066040 A1* | 3/2005 | Borella | ................ | H04L 29/06 709/228 |
| 2005/0120221 A1* | 6/2005 | Arnold | ................ | H04L 12/14 713/182 |
| 2006/0031394 A1 | 2/2006 | Tazuma | | |
| 2006/0075123 A1* | 4/2006 | Burr | ................ | H04L 29/12311 709/228 |
| 2006/0206933 A1* | 9/2006 | Molen | ................ | H04L 63/0428 726/14 |
| 2007/0025305 A1* | 2/2007 | Denny | ................ | H04L 61/2015 370/338 |
| 2009/0129386 A1* | 5/2009 | Rune | ................ | H04L 12/2881 370/392 |
| 2010/0011215 A1* | 1/2010 | Lior | ................ | H04L 63/0823 713/176 |
| 2010/0195621 A1* | 8/2010 | Kekki | ................ | H04W 48/17 370/332 |
| 2011/0242975 A1* | 10/2011 | Zhao | ................ | H04L 29/12216 370/230 |
| 2012/0131644 A1 | 5/2012 | Khalil et al. | | |
| 2013/0031000 A1* | 1/2013 | Morris | ................ | G06F 9/45533 705/44 |
| 2013/0097674 A1* | 4/2013 | Jindal | ................ | H04L 63/0876 726/4 |
| 2013/0103833 A1* | 4/2013 | Ringland | ................ | H04L 63/0823 709/224 |
| 2013/0232561 A1* | 9/2013 | Gupta | ................ | H04W 8/18 726/5 |
| 2013/0260796 A1* | 10/2013 | Hasek | ................ | H04W 4/02 455/456.3 |

* cited by examiner

IP ADDRESS ALLOCATION

RELATED APPLICATIONS

This application claims priority to U.S. Provisional Patent Application No. 61/682,863 filed on Aug. 14, 2012, the content of which is incorporated herein by reference in its entirety.

BACKGROUND

An Internet Protocol address (IP address) is a numerical label assigned to each device participating in a computer network that uses the Internet Protocol (IP) for communication. An IP address serves important functions, such as identification and location addressing. With the number of networked IP devices growing every day, a public or routable IP address becomes a scarce resource. Conventionally, when a device is connected to a network, a public or routable IP address is assigned to the device even if the device does not use any network services. This can lead to unnecessary allocation of network resources (e.g., IP addresses). Thus, there is a need for better management of network resources (e.g., IP addresses).

SUMMARY

In accordance with the disclosed subject matter, systems and methods are described for IP address allocation.

Disclosed subject matter includes, in one aspect, a computerized method, which includes receiving at a wireless access gateway a request from a subscriber to connect to a network, allocating a first IP address to the subscriber from a first pool of IP addresses at the wireless access gateway, and assigning a second IP address to the subscriber from a second pool of IP addresses at the wireless access gateway when the subscriber requests a network service.

In some embodiments, the first pool of IP addresses contains private IP addresses and the second pool of IP addresses contains pubic IP addresses.

In some embodiments, the first IP address is for a limited network connectivity.

In some embodiments, the first IP address is for authentication purpose.

In some embodiments, the first IP address is for a limited duration.

In some embodiments, the computerized method further includes returning the first IP address to the first pool of IP addresses at the wireless access gateway if the subscriber does not request a network service within the limited duration.

In some embodiments, the computerized method further includes authenticating and authorizing the subscriber before assigning the second IP address.

In some embodiments, the computerized method further includes authenticating the subscriber based on a Media Access Control (MAC) address of the subscriber.

In some embodiments, the authenticating and authorizing is based on a Remote Access Dial In User Service (RADIUS) protocol with an authentication, authorization, and accounting (AAA) server.

In some embodiments, the computerized method further includes generating a subscriber context for the subscriber at the wireless access gateway.

In some embodiments, the computerized method further includes translating in data packets originated from and destined to the subscriber between the first and second IP addresses of the subscriber.

In some embodiments, the translating occurs only in head sections of the data packets.

In some embodiments, the computerized method further includes sending an authentication request message to an authentication, authorization, and accounting (AAA) server, and receiving an authentication access message from the AAA server.

In some embodiments, the computerized method further includes including a Media Access Control (MAC) address of the subscriber in the authentication request message to the AAA server.

In some embodiments, the computerized method further includes detecting a re-directing URL in the authentication access message from the AAA server.

In some embodiments, the computerized method further includes receiving a Change of Authorization (CoA) message from the AAA server.

Disclosed subject matter includes, in another aspect, a wireless access gateway, which includes an IP address manager configured to maintain a first and a second pool of IP addresses, and a subscriber manager configured to receive a request from a subscriber to connect to a network and to allocate a first IP address to the subscriber from the first pool of IP addresses, wherein the subscriber manager further configured to assign a second IP address to the subscriber when the subscriber requests a network service.

In some embodiments, the first pool of IP addresses contains private IP addresses and the second pool of IP addresses contains pubic IP addresses.

In some embodiments, the subscriber manager is further configured to generate a subscriber context for the subscriber.

In some embodiments, the wireless access gateway further includes an authentication manager configured to authenticate and authorize the subscriber before the second IP address is assigned to the subscriber.

In some embodiments, the authentication manager contains an authentication, authorization, and accounting (AAA) server connector configure to communicate with an AAA server.

In some embodiments, the wireless access gateway further includes a Generic Routing Encapsulation (GRE) tunnel manager configured to process uplink and downlink traffic data from and to the subscriber in one or more GRE tunnels.

In some embodiments, the wireless access gateway further includes an IP address translator configured to translate in data packets originated from and destined to the subscriber between the first and second IP addresses of the subscriber.

In some embodiments, the IP address translator is further configured to translate only head sections of the data packets.

Disclosed subject matter includes, in yet another aspect, a non-transitory computer readable medium having executable instructions which are operable to, when executed by a processor, cause the processor to receive at a wireless access gateway a request from a subscriber to connect to a network, allocate a first IP address to the subscriber from a first pool of IP addresses at the wireless access gateway, and assign a second IP address to the subscriber from a second pool of IP addresses at the wireless access gateway when the subscriber requests a network service.

In some embodiments, the executable instructions are further operable to, when executed by the processor, authenticate and authorize the subscriber before assigning the second IP address.

Various embodiments of the subject matter disclosed herein can provide one or more of the following capabilities. The allocation of private IP addresses for a limited network connectivity and for a limited duration can economize the use of public or routable IP addresses for migrant subscribers. In one aspect, since the public IP addresses are allocated only for the subscribers who intend to use the network, it can help avoid the denial of service to such subscribers due to public IP address exhaustion. In another aspect, the systems and methods in the disclosed subject matter can help ensure that the network resources are allocated to the subscribers who intend to use network services thus enhancing the overall service provider's revenue stream and also increasing the service availability of the network.

These and other capabilities of embodiments of the disclosed subject matter will be more fully understood after a review of the following figures, detailed description, and claims.

DESCRIPTION

Figure 1:
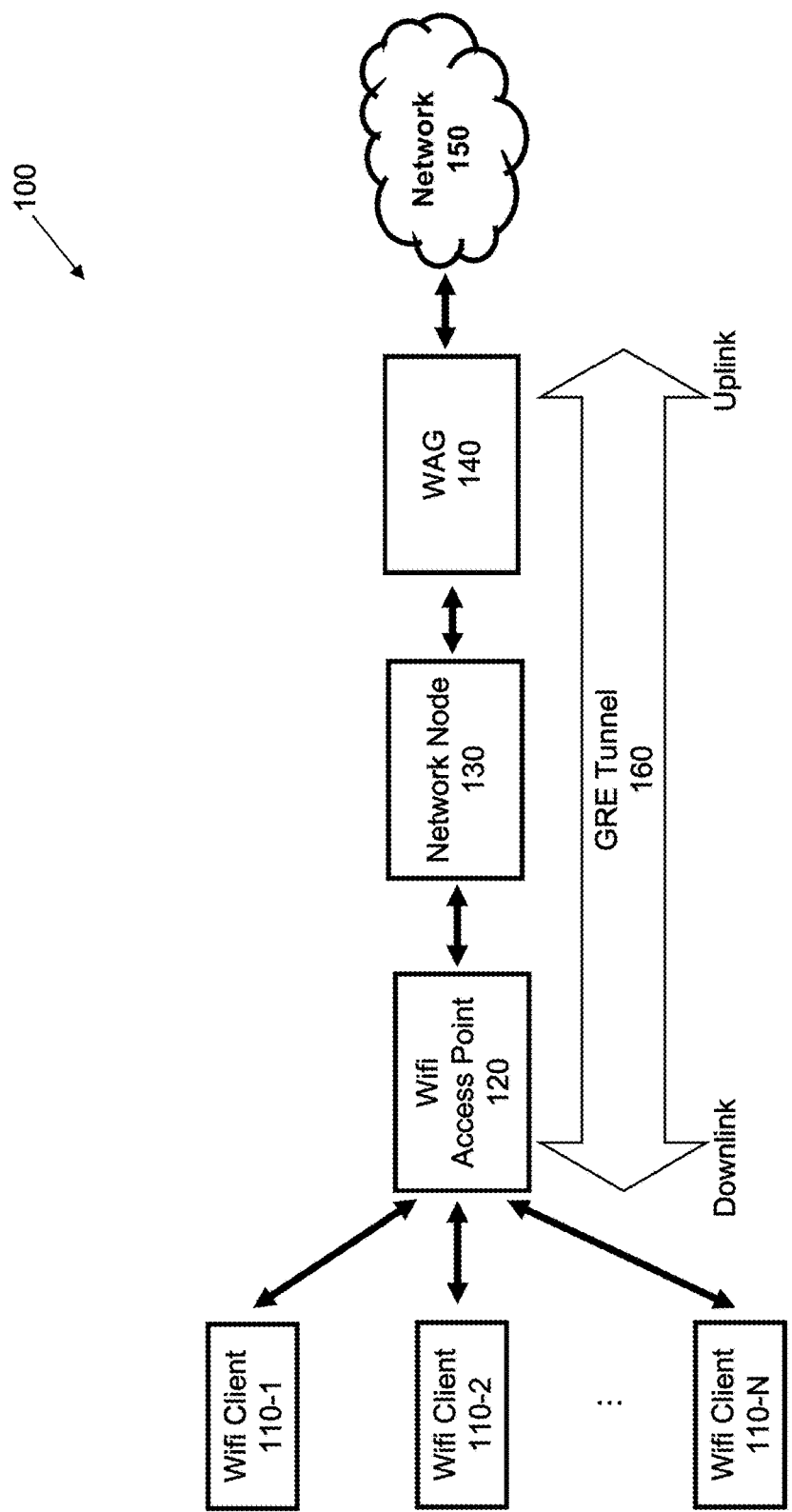
FIG. 1 illustrates an exemplary network environment.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Wireless devices have become more and more popular. In certain configuration, a wireless device can connect to a wireless network (e.g., via an access point) automatically and sometimes without knowledge. This is especially true if the wireless device has connected to a particular wireless network before. For example, a user once browsed the Internet using her smartphone via the wireless network in a coffee shop; next time the user walks into the coffee shop, her smartphone can connect to the wireless network in the coffee shop automatically before the user takes it out of her pocket and even if the smartphone stays in her pocket during her entire visit to the coffee shop. Conventionally, as soon as a wireless device is connected to a wireless network, a public or routable IP address is assigned to the wireless device before the wireless device attempts to actually use any network service (e.g., browsing the Internet). Statistics show that about 80% of Wi-Fi subscribers are migrant subscribers. Examples of migrant subscribers include those subscribers that happen to connect to a Wi-Fi network but do not use any network services. Allocation of public IP addresses to those migrant subscribers can lead to waste of network resources, can increase the risk of denial of service due to public IP address exhaustion, and can hamper revenue potentials if the would-be available network resource is a paid service.

A wireless access gateway disclosed in the embodiments herein can provide an improved mechanism for allocating network resources (e.g., IP address). In one exemplary implementation, when a subscriber, whether dormant or not, connects to a wireless network, a wireless access gateway can allocate an IP address to the subscriber for a limited network connectivity (e.g., for authentication only) and for a limited duration (e.g., 1 minute). The allocated IP address can be temporary and can come from a private IP address pool of the wireless access gateway. If the subscriber stays dormant beyond the limited duration, the allocated IP address can be reclaimed and ready for reassignment to another subscriber. If the subscriber chooses to use the network services during the limited duration and is authenticated and authorized (e.g., by the service provider), the wireless access gateway can assign another IP address to the subscriber from its public or routable IP address pool. For all traffics originated from the subscriber, the subscriber's allocated private IP address can be replaced by the assigned public IP address; and for all traffics destined to the subscriber the assigned public IP address can be replaced by the subscriber's allocated private IP address. The IP address translation can be performed in the IP header of the packet; the subscriber payload can thus be unaffected by this translation.

Embodiments of the disclosed subject matter can be implemented in a networked computing environment. FIG. 1 illustrates an exemplary network environment 100 in accordance with certain embodiments of the disclosed subject matter. The network environment 100 can include at least one Wi-Fi client (e.g., client 110-1, 110-2, . . . 110-N), a Wi-Fi access point 120, a network node 130, a wireless access point (WAG) 140, and a network 150. In this document, the reference number 110 can be used to refer to multiple Wi-Fi clients collectively or to a particular Wi-Fi client.

The Wi-Fi client 110 can be any computing device capable of accessing a Wi-Fi network. Examples of the Wi-Fi client 110 include desktop computers, portable computers, smartphones, tablets, and any other Wi-Fi capable mobile devices. The Wi-Fi access point 120 can be configured to allow one or more Wi-Fi clients 110 to access the network environment 100. Examples of the Wi-Fi access point 120 include a wireless LAN router. The Wi-Fi client 110 can connect to the Wi-Fi access point 120 via a network protocol (e.g., IEEE 802.11). The Wi-Fi access point can also connect to another network node 130. One example of the network node 130 is a Data Over Cable Service Interface Specification (DOCSIS) cable modem termination system (CMTS). The network node 130 can then connect to the WAG 140, which is connected to the network 150 (e.g., the Internet). The WAG 140 can act as a gateway for the Wi-Fi clients 110 to access the network 150.

One or more Generic Routing Encapsulation (GRE) tunnels 160 can be maintained between the Wi-Fi access point 120 and the WAG 140. On the uplink side, the Wi-Fi access point 120 can encapsulate the uplink payloads (e.g., Ethernet payloads) from a Wi-Fi client (e.g., a subscriber) 110 into a GRE tunnel 160, which can terminate at the WAG 140. The WAG 140 can support termination of the GRE tunnels 160 coming from the Wi-Fi access point 120 and de-capsulate the uplink payloads (e.g., Ethernet payloads) and route them to the network 150. On the downlink side, the WAG 140 can encapsulate the downlink payloads coming from the network 150 destined to a Wi-Fi client (e.g. a subscriber) 110 in a GRE tunnel 160 and send the payloads to the corresponding Wi-Fi access point 120.

Embodiments of a wireless access gateway (WAG) can support two types of subscribers: unauthorized and pre-authenticated. An unauthorized subscriber is a subscriber that is not authorized to access certain network services (e.g., accessing the Internet). An unauthorized subscriber can be required to go through authentication and authorization process before it can access certain network services. For example, a mobile device trying to access a hotel-guest-only Wi-Fi network in a hotel guestroom the first time can be an unauthorized subscribers. The mobile device can be required to authenticate itself to Wi-Fi network (e.g., via its Media Access Control (MAC) address) and obtain authorization from the Wi-Fi network (e.g., when the user types in her name and hotel guestroom information) before the mobile device can access certain services (e.g., the Internet). A pre-authenticated subscriber is a subscriber that is already authenticated and authorized to access the network services (e.g., accessing the Internet) and therefore does not need to go through authentication and authorization process. For example, the mobile device described in the previous example can become a pre-authenticated subscriber to the hotel-guest-only Wi-Fi network after it successfully finishes the authentication and authorization process. When the mobile device connects to the hotel-guest-only Wi-Fi network again after a period of disconnection (within certain limitation), the mobile device does not need to go through the authentication and authorization process any more since it is a pre-authenticated subscriber to the hotel-guest-only Wi-Fi network.

Figure 2:
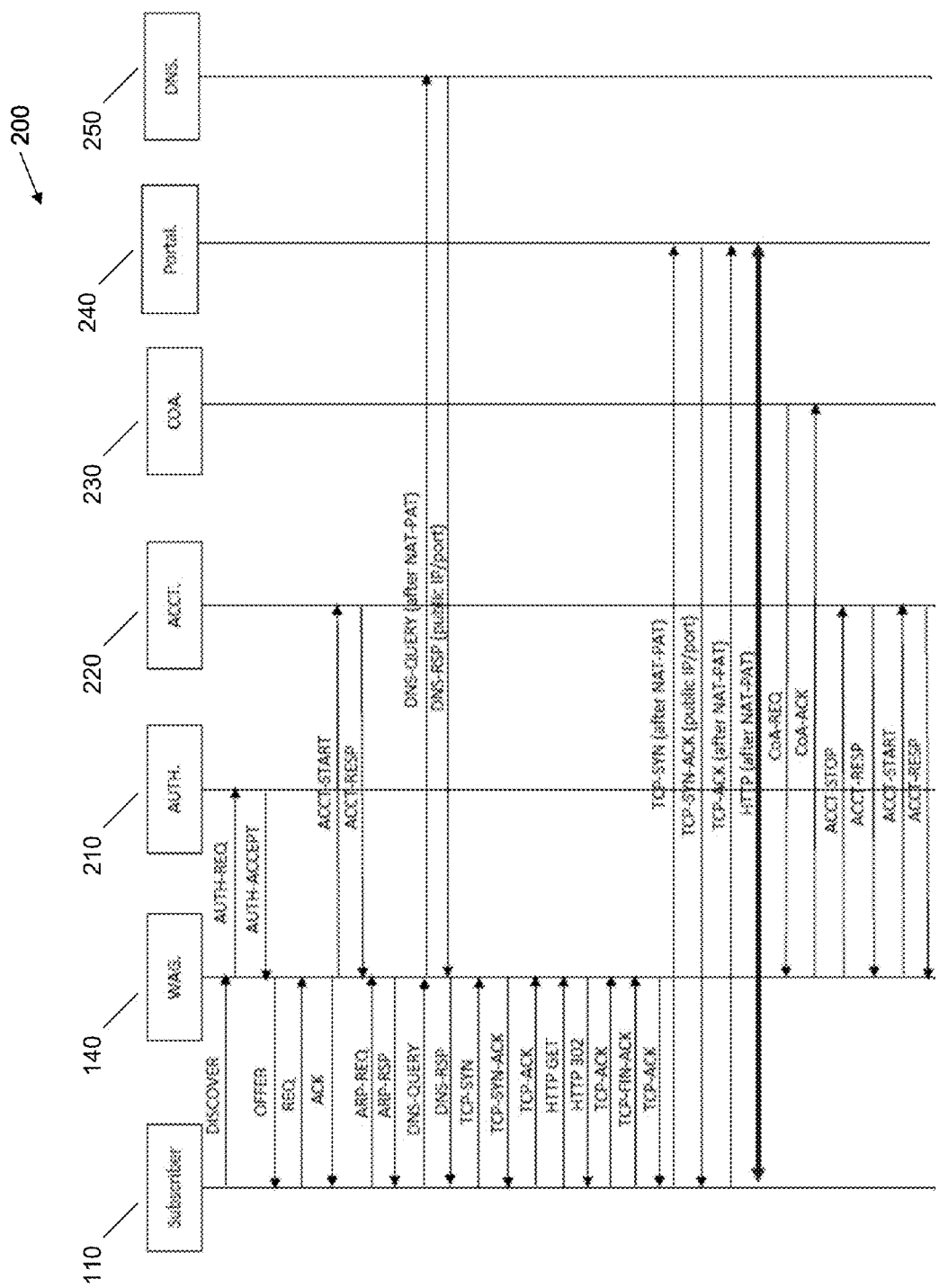
FIG. 2 illustrates an exemplary scenario of network access for an unauthorized subscriber.

FIG. 2 illustrates an exemplary scenario 200 of network access for an unauthorized subscriber. The WAG 140 can serve as the interface between the subscriber 110 and certain network resources. The network resources illustrated in FIG. 2 can include an authentication and authorization server 210, an accounting server 220, a change of authorization (CoA) server 230, a portal server 240, and a domain name server (DNS) server 250. The authentication and authorization server 210 can provide authentication and authorization service to the subscribers of a network. The accounting server 220 can provide accounting service to the subscribers (e.g., for usage recording and billing purpose). In some embodiments, the authentication and authorization server 210 and the accounting server 220 can be combined into an authentication, authorization, and accounting (AAA) server. An AAA server can provide centralized authentication, authorization, and accounting management to subscribers via a network protocol, such as the Remote Access Dial In User Service (RADIUS) protocol. The CoA server 230 can manage changing the authorization to the subscribers. For example, the CoA server 230 can change a subscriber's status from "unauthorized" to "authorized" once the correct login credential is received. The portal server 240 can provide additional authorization service to the subscribers. For example, a hotel's portal server can allow a guest to enter her login credentials to authorize a subscriber and can coordinate with the CoA server 230 to change a subscriber's status to "authorized" once the correct login credential is received and verified. The DNS server 250 can help resolve the IP addresses of the website domains the subscribers try to visit. In some embodiments, two or more components described above can be combined into a single server. In some embodiments, certain function can be split among two or more components.

Referring to FIG. 2, when the subscriber 110 first tries to connect to a network, the subscriber can send a DISCOVER message to the WAG 140. The DISCOVER message can contain information (e.g., a MAC address) about the subscriber. Upon receiving the DISCOVER message, the WAG 140 can create a subscriber context for the subscriber, send an AUTH-REQ message to the authentication and authority server 210, and in turn receive an AUTH-ACCEPT message back from the authentication and authority server 210. In one embodiment, the WAG 140 can send the MAC address received from the subscriber in the AUTH-REQ message to the authentication and authority server 210 for MAC authentication. Based on the AUTH-ACCEPT message received from the authentication and authorization server 210, the WAG 140 can determine whether the subscriber is an unauthorized subscriber or a pre-authenticated subscriber. In some embodiments, if the AUTH-ACCEPT message contains a redirect URL as a Vendor-Specific Attribute (VSA), the WAG 140 can classify the subscriber as unauthorized; otherwise, the WAG 140 can classify the subscriber as pre-authenticated.

The WAG 140 can then send an OFFER message back to the subscriber. If the subscriber is unauthorized, the WAG 140 can allocate one IP address from a private IP address pool and send the IP address in the OFFER message to the subscriber. The allocated IP address can be for a limited network connectivity (e.g., for authentication only). The allocated IP address can also be temporary or for a limited duration only (e.g., 1 minute). If the subscriber 110 remains dormant beyond the limited duration, the WAG 140 can release the allocated IP address and return it back to the private IP address pool. The exemplary scenario 200 of network access can then be over and reset. If the subscriber starts accessing network services (e.g., browsing the Internet) within the limited duration, the WAG 140 can receive the request and continue on with the authentication and authorization process. For example, if the subscriber 110 starts to browser to an Internet website, the subscriber can send an ARP-REQ (Address Resolution Protocol request) message to the WAG 140 to resolve the website address.

For unauthorized subscribers, authentication and authorization can be required before traffic forwarding can be started. After the temporary IP address allocation, the WAG 140 can trap any HTTP packets coming from the subscriber 110 and act as a HTTP proxy by sending re-direct responses (e.g., response code 302) for the HTTP Get requests. This can result in the subscriber getting re-directed to a captive portal website where the subscriber is authenticated further by, e.g., the portal server 240 or a service provider.

The WAG 140 can then act as a RADIUS CoA server to receive the CoA message from an AAA server (e.g., 230) confirming the authentication of subscriber at the captive portal site. Once a CoA message is received from an AAA server for the subscriber, the WAG 140 can mark the subscriber as authenticated and assign it a different IP address from its public/routable IP address pool. The WAG 140 can then allow packet forwarding for both uplink and downlink data. For all traffics originated from the subscriber, the subscriber's allocated private IP address can be replaced by the assigned public IP address; and for all traffics destined to the subscriber the assigned public IP address can be replaced by the subscriber's allocated private IP address. The IP address translation can be performed just in the IP header of the packet; the subscriber payload can thus be unaffected by this translation.

In some embodiments, the WAG 140 can also perform accounting for authenticated and authorized subscribers by counting uplink and downlink payload data and send the accounting updates to an AAA or accounting server (e.g., 210 or 220).

When a Dynamic Host Configuration Protocol (DHCP) release is received, when the lease timer for the public IP address timer expires, or when the session timer expires, the WAG 140 can delete the subscriber context for the authenticated and authorized subscriber. As a result, the subscriber can become an unauthorized subscriber.

Figure 3:
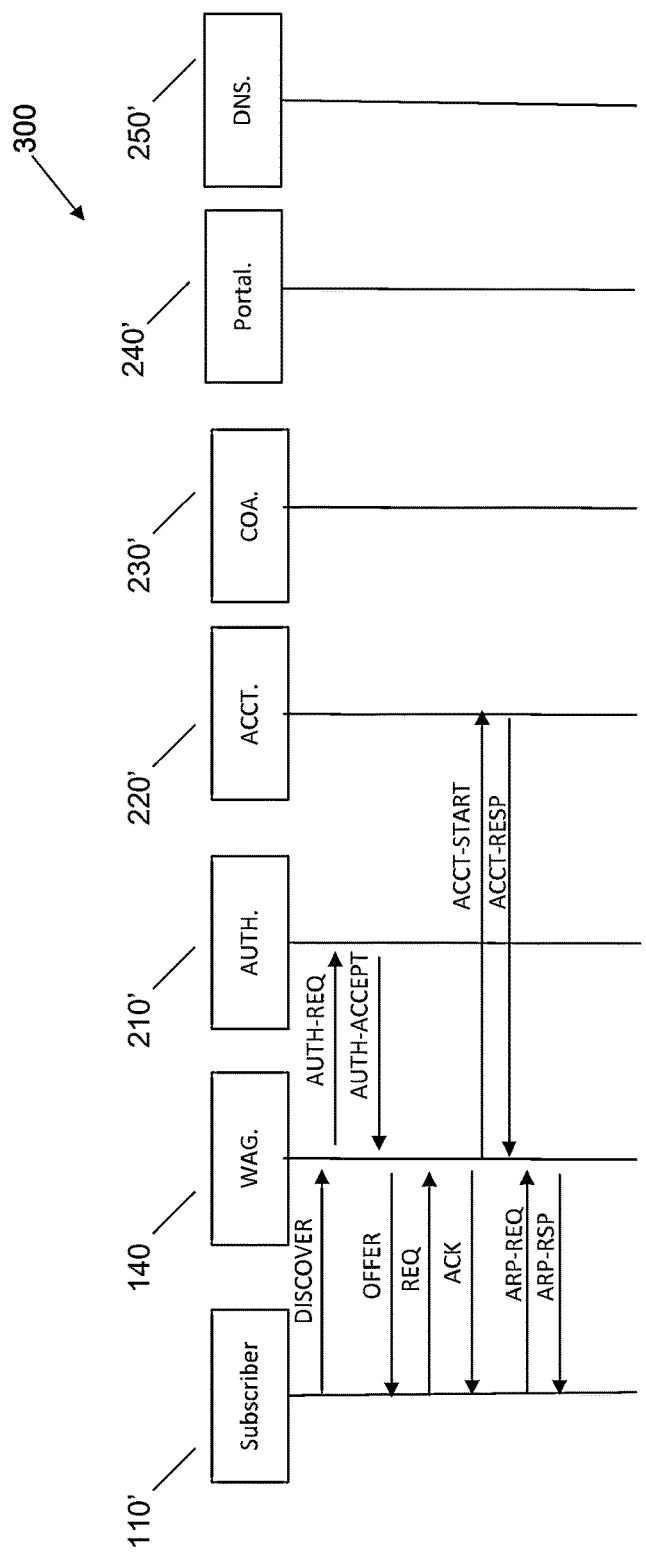
FIG. 3 illustrates an exemplary scenario of network access for a pre-authenticated subscriber.

FIG. 3 illustrates an exemplary scenario 300 of network access for a pre-authenticated subscriber. Similar to the arrangement in FIG. 2, the WAG 140 can serve as the interface between the subscriber 110' and certain network resources. The network resources illustrated in FIG. 3 can include an authentication and authorization server 210', an accounting server 220', a change of authorization (CoA) server 230', a portal server 240', and a domain name server (DNS) server 250', which can perform similar functions as their counterparts illustrated in FIG. 2. Similar to the arrangement in FIG. 2, in some embodiments, two or more components described above can be combined into a single server; in some embodiments, certain function can be split among two or more components.

Referring to FIG. 3, when the pre-authenticated subscriber 110' tries to reconnect to a network, the subscriber 110' can send a DISCOVER message to the WAG 140. The DISCOVER message can contain information (e.g., a MAC address) about the subscriber sender. Upon receiving the DISCOVER message, the WAG 140 can send an AUTH-REQ message to the authentication and authority server 210' and in turn receive an AUTH-ACCEPT message back from to the authentication and authority server 210'. Based on the AUTH-ACCEPT message received from the authentication and authorization server 210, the WAG 140 can determine whether the subscriber is an unauthorized subscriber or a pre-authenticated subscriber. In some embodiments, if the AUTH-ACCEPT message contains a redirect URL as a Vendor-Specific Attribute (VSA), the WAG 140 can classify the subscriber as unauthorized; otherwise, the WAG 140 can classify the subscriber as pre-authenticated.

If the WAG 140 determines the subscriber 110' is pre-authenticated, the WAG 140 can assign the same public IP address as was assigned earlier to the subscriber and continue to keep the subscriber in the authenticated state. The WAG 140 can send the assigned public IP address to the subscriber in an OFFER message back to the subscriber 110'. For pre-authenticated subscribers, the WAG 140 can start forwarding network traffic in both uplink and downlink directions as soon as the public IP address is assigned.

Figure 4:
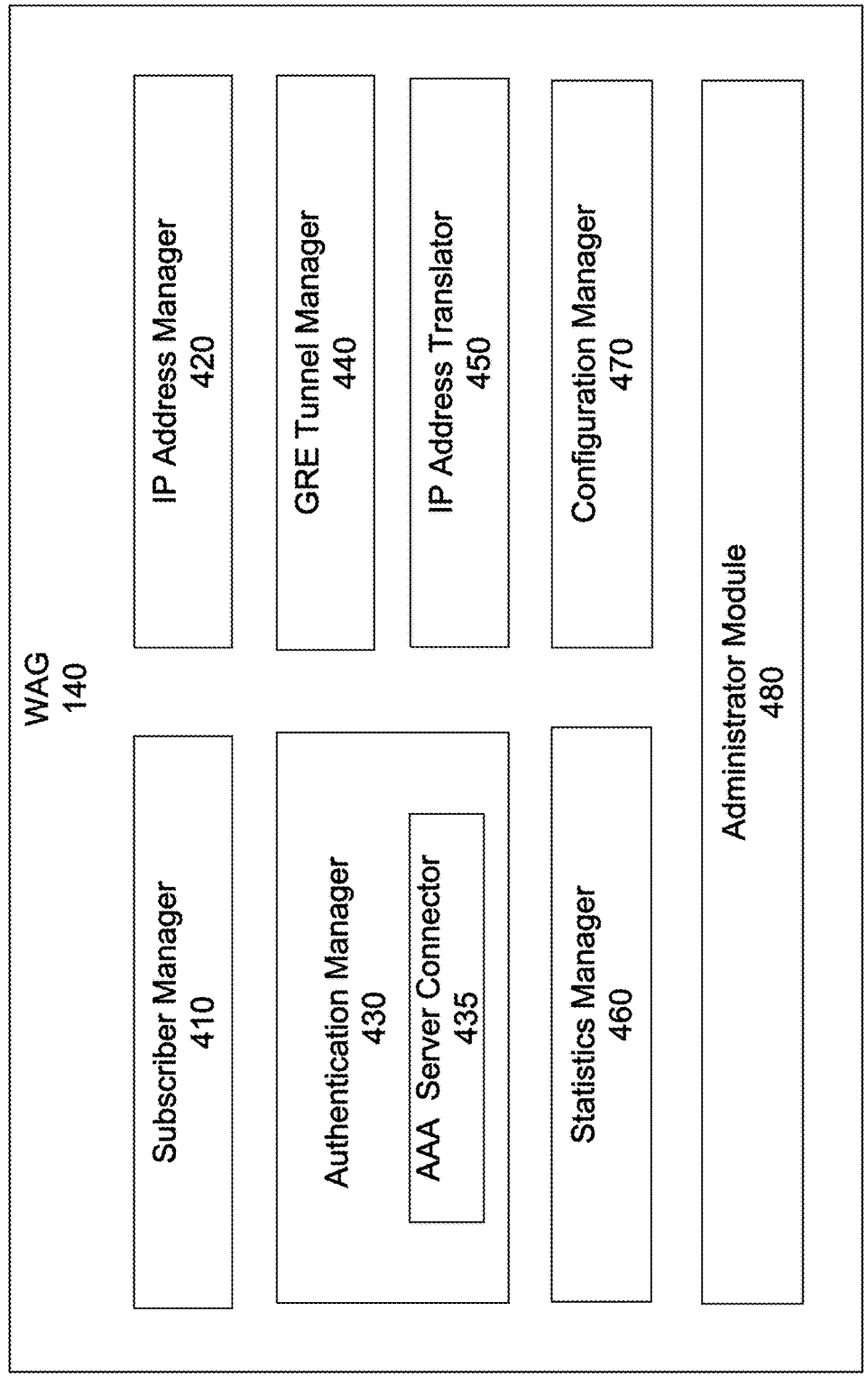
FIG. 4 contains a block diagram of an exemplary wireless access gateway (WAG).

FIG. 4 contains a block diagram of an exemplary wireless access gateway (WAG) 140 according to certain embodiments of the disclosed subject matter. The WAG 140 can include a subscriber manager 410, an IP address manager 420, an authentication manager 430, a GRE tunnel manager 440, an IP address translator 450, a statistics manager 460, a configuration manager 470, and an administrator module 480. The WAG 140 can include additional modules, fewer modules, or any other suitable combination of modules that perform any suitable operation or combination of operations. Two or more components can be combined or merged. Certain function can be split among two or more components.

The subscriber manager 410 can manage the subscribers of a network. In some embodiments, the subscriber manager 410 can create and maintain a subscriber context for each subscriber. The subscriber manager 410 can classify the subscribers into two categories: unauthorized or pre-authenticated. As described earlier, an unauthorized subscriber is a subscriber that is not authorized to access certain network services (e.g., accessing the Internet). An unauthorized subscriber can be required to go through authentication and authorization process before it can access certain network services. A pre-authenticated subscriber is a subscriber that is already authenticated and authorized to access the network services (e.g., accessing the Internet) and therefore does not need to go through authentication and authorization process. The subscriber manager 410 can also manage leases or section durations for the subscribers. The subscriber manager 410 can delete a subscriber context when a lease or session expires. In some embodiments, the WAG 140 can also maintain a database for storing the leases for the subscribers and other data which can be used to perform recovery action after a failure (e.g., network interrupt). In some embodiments, a subscriber manager (e.g., 410 in FIG. 4) can be implemented in hardware and/or software running on a general or dedicated processor in a WAG (e.g., 140 in FIG. 1).

The IP address manager 420 can manage IP address allocation and assignment to subscribers. In some embodiments, the IP address manager 420 can maintain a private IP address pool and a public IP address pool. The private IP address pool can contain a number of private IP addresses. The public IP address pool can contain a number of public IP addresses, which can be routable IP addresses. Compared to private IP addresses, public or routable IP addresses are generally limited resources. The IP address manager 420 can allocate an IP address from the private IP address pool to a subscriber when it first connects to a network. The allocated IP address can be for a limited network connectivity only and can be for a limited duration. If the subscriber remains dormant beyond the limited duration, the IP address manager can release the allocated IP address and return it back to the private IP address pool. If the subscriber accesses network services within the limited duration and satisfies the authentication and authorization process, the IP address manager 420 can assigned a different IP address from the public IP address pool. In some embodiments, an IP address manager (e.g., 420 in FIG. 4) can be implemented in hardware and/or software running on a general or dedicated processor in a WAG (e.g., 140 in FIG. 1).

The private and public IP address pools at the WAG 140 can be configurable. In one example, the duration (e.g., expiration timer) of private IP addresses in the private IP address pool can be configured to fit different needs and situations. When the duration expires, a private IP address can be recycled and put back into the private IP pool. In another example, the lease time (e.g., renew timer) of public IP addresses in the public IP address pool can also be configured to fit different needs and situations. When the lease time expires (without renewal), the public IP address can be reclaimed and put back into the public IP address pool.

The authentication manager 430 can provide authentication and authorization service to the subscribers. In some embodiments, the authentication manager 430 can contain an AAA server connector 435, which can serve as an interface between the WAG 140 and an authentication, authorization, and accounting (AAA) server. The authentication manager 430 can send and receive authentication/ authorization/accounting related messages to/from an AAA server (e.g., 210/220/230 in FIG. 2) via the AAA connector server 435. In some embodiments, the authentication manager 430 can support configuration of an AAA server and other related parameters for RADIUS via the AAA connector server 435. In some embodiments, the authentication manager 430 can also support configuration for acting as an RADIUS server for processing CoA messages, via the AAA connector server 435. In some embodiments, an authentication manager (e.g., 430 in FIG. 4) can be implemented in hardware and/or software running on a general or dedicated processor in a WAG (e.g., 140 in FIG. 1).

The GRE tunnel manager 440 can manage one or more GRE tunnels between an access point (e.g., 120 in FIG. 1) and the WAG 140. The GRE tunnel manager 440 can support termination of the GRE tunnels coming from the Wi-Fi access point and de-capsulate the uplink payloads (e.g., Ethernet payloads) and route them to an external network. On the downlink side, the GRE tunnel manager 440 can encapsulate the downlink payloads coming from an external network destined to a Wi-Fi client (e.g. a subscriber) in a GRE tunnel and send the payloads to the corresponding Wi-Fi access point. In some embodiments, the GRE tunnel manager 440 can delete a GRE tunnel when no subscriber for the tunnel exists and the tunnel inactivity timer expires. In some embodiments, an GRE tunnel manager (e.g., 440 in FIG. 4) can be implemented in hardware and/or software running on a general or dedicated processor in a WAG (e.g., 140 in FIG. 1).

The IP address translator 450 can perform IP address translation for subscribers. In some embodiments, the IP address translator 450 can translate between a public/routable IP address assigned to a subscriber and the private IP address allocated to the subscriber. For all traffics originated from a subscriber, the subscriber's allocated private IP address can be replaced by the assigned public IP address; and for all traffics destined to the subscriber the assigned public IP address can be replaced by the subscriber's allocated private IP address. The IP address translation can be performed in the IP header of the packet; the subscriber payload can thus be unaffected by this translation. In some embodiments, an IP address translator (e.g., 450 in FIG. 4) can be implemented in hardware and/or software running on a general or dedicated processor in a WAG (e.g., 140 in FIG. 1).

The statistics manager 460 can manage statistics for the WAG 140. Examples of statistics managed by the statistics manager 460 include the total number of pre-authenticated subscribers, the total number of authorized subscribers, the total number of "migrant" subscribers which never visit the captive portal website, and the total number of subscribers which are not yet assigned IP addresses. In some embodiments, the statistics manager 460 can maintain statistics on a per GRE tunnel basis.

The configuration manager 470 can configure the WAG 140 for fit different needs and situations. Examples of configurations include the tunnel inactivity timer, the default session timeout for the subscriber, the default idle timeout for the subscriber, the default public NAT IP pool for the subscriber, the operator-name for NAS server, and whether to have accounting session for unauthenticated subscriber or not.

The administrator module 470 can provide support for system administrators to maintain and monitor the WAG 140. In some embodiments, the administrator module 470 can support command line tools for network administrators. In some embodiments, the administrator module 470 can support comprehensive counter and debugging/logging capabilities to enable administrators to troubleshoot network issues and also to diagnose issues pertaining to specific subscribers.

Figure 5:
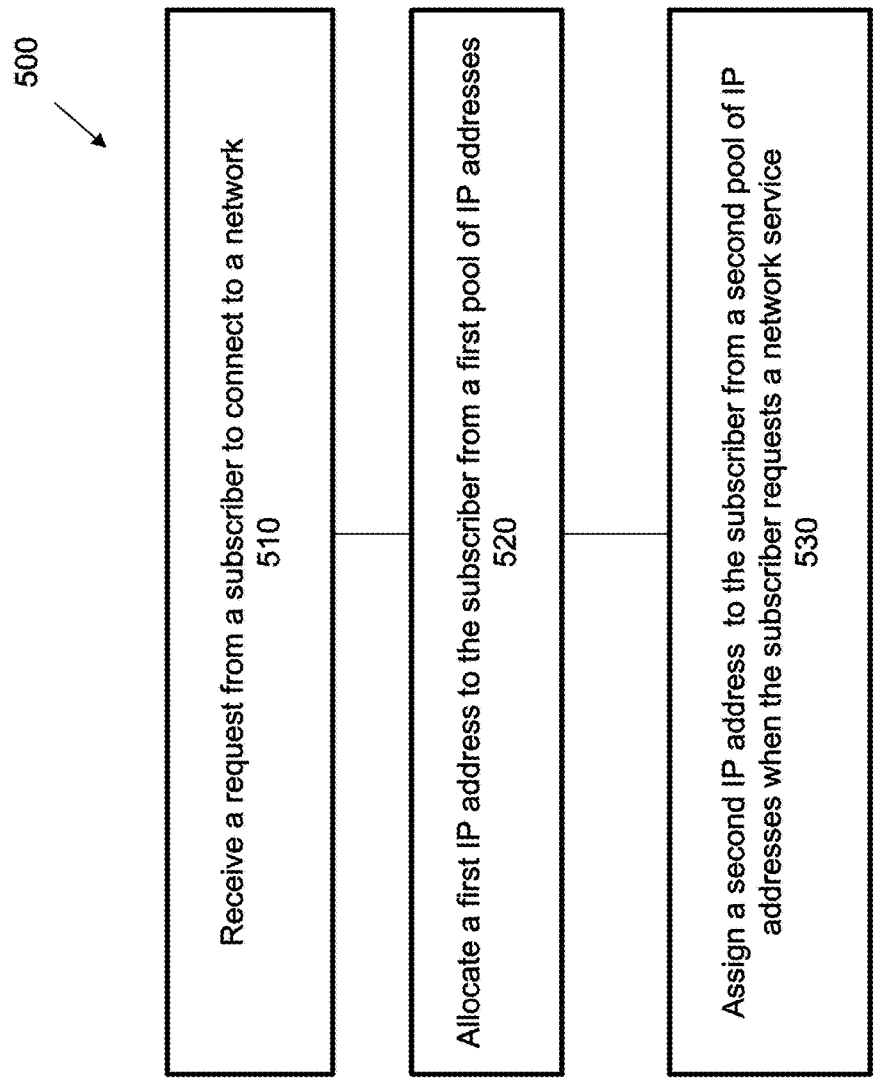
FIG. 5 illustrates an exemplary operation of IP address allocation.

FIG. 5 illustrates an exemplary operation 500 of IP address allocation according to certain embodiments of the disclosed subject matter. The operation 500 can be modified by, for example, having stages rearranged, changed, added and/or removed.

At stage 510, a request to connect to a network from a subscriber can be received at, e.g., a wireless access gateway (such as 140 in FIG. 1). The subscriber may or may not request a network service from the network. As discussed above, subscribers that simply connect to the network but do not intend to use any network services can be examples of migrant subscribers.

At stage 520, a first IP address can be allocated to the subscriber. In some embodiments, the wireless access gateway (e.g., 140 in FIG. 1) can allocate the first IP address from a first pool of IP addresses. The first pool of IP addresses can contain private IP addresses. In some embodiments, the first IP address can be for a limited network connectivity (e.g., for authentication purpose). In some embodiments, the first IP address can be for a limited duration. The first IP address can be recovered and returned to the first pool of IP addresses at the wireless access gateway if the subscriber does not request a network service within the limited duration.

At stage 530, a second IP address can be assigned to the subscriber. In some embodiments, the wireless access gateway (e.g., 140 in FIG. 1) can assign the second IP address from a second pool of IP addresses. The second pool of IP addresses can contain public or routable IP addresses. In some embodiments, the wireless access gateway can assign the second IP address to the subscriber when the subscriber requests a network service.

Optionally, the subscriber can be authenticated and authorized before the second IP address is assigned to the subscriber. In some embodiments, the authentication can be based on a Media Access Control (MAC) address of the subscriber. In some embodiments, the authentication can be based on a Remote Access Dial In User Service (RADIUS) protocol with an authentication, authorization, and accounting (AAA) server.

Optionally, the exemplary operation 500 can include generating a subscriber context for the subscriber at the wireless access gateway and can also include translating in data packets originated from and destined to the subscriber between the first and second IP addresses of the subscriber.

Figure 6:
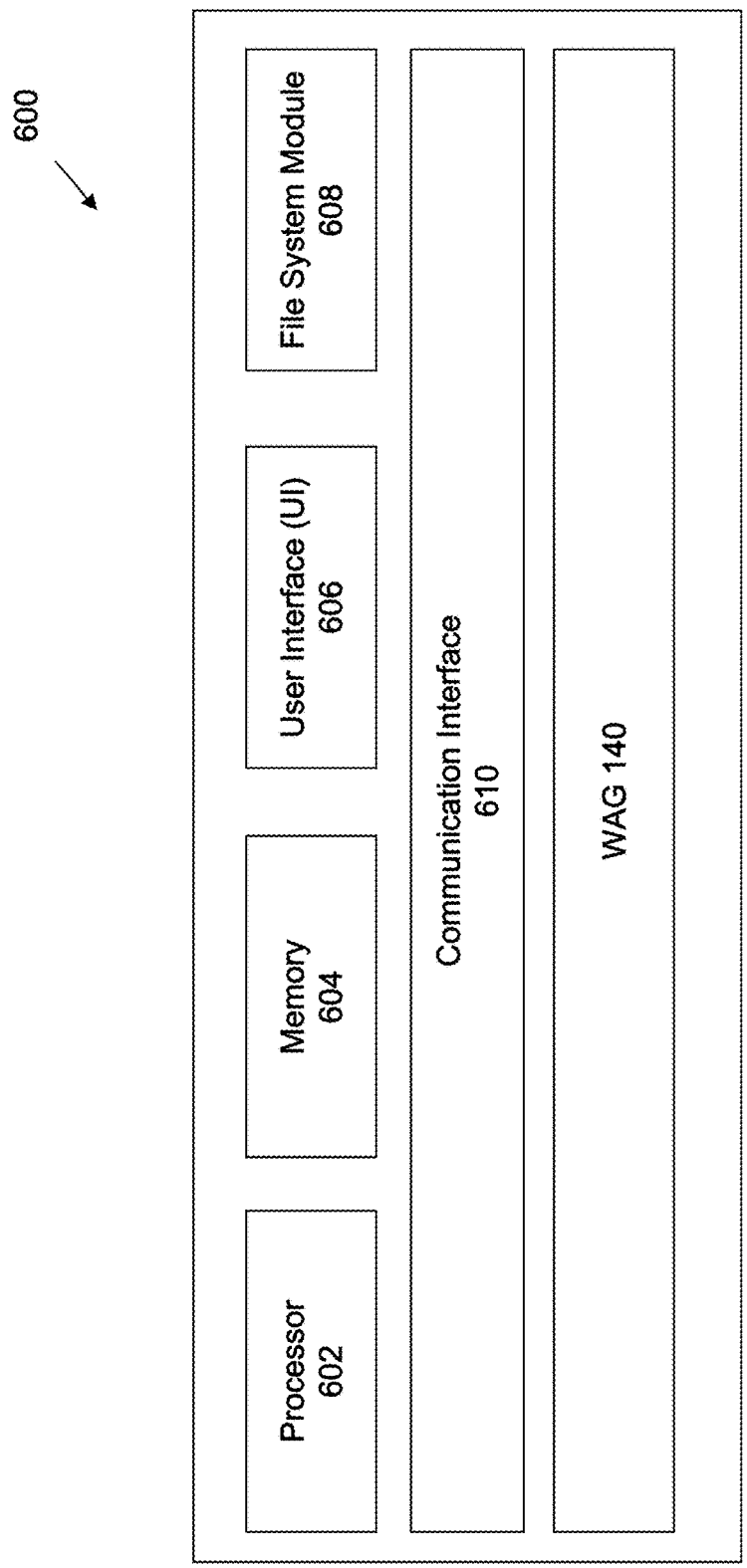
FIG. 6 contains a block diagram of an exemplary computing device.

FIG. 6 illustrates a block diagram of an exemplary computing device 600 according to certain embodiments of the disclosed subject matter. The computing device 600 can include at least one processor 602 and at least one memory 604. The processor 602 can be hardware that is configured to execute computer readable instructions such as software. The processor 602 can be a general processor or be an application specific hardware (e.g., an application specific integrated circuit (ASIC), programmable logic array (PLA), field programmable gate array (FPGA), or any other integrated circuit). The processor 602 can execute computer instructions or computer code to perform desired tasks. The memory 604 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The computing device 600 can also optionally include a user interface (UI) 606, a file system module 608, and a communication interface 610. The UI 606 can provide an interface for users to interact with the computing device 600 in order to access the WAG 140. The file system module 608 can be configured to maintain a list of all data files, including both local data files and remote data files, in every folder in a file system. The file system module 608 can be further configured to coordinate with the memory 604 to store and cache files/data. The communication interface 610 can allow the computing device 600 to communicate with external resources (e.g., a network or a remote client/server). The computing device 600 can also include a WAG 140. The description of the WAG 140 and its functionalities can be found in the discussion of FIGS. 1-5. The computing device 600 can include additional modules, fewer modules, or any other suitable combination of modules that perform any suitable operation or combination of operations.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "manager," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or other factor(s).

What is claimed is:

1. A computerized method for allocating a first IP address to a device that is used for authentication after the device requests a network connection, and only allocating a second IP address to the device that provides access to one or more network services after the device request a network service, so that IP addresses used to access network services can be reserved only for devices requesting one or more network services comprising:
    receiving at a wireless gateway a request from a subscriber to connect to a network;
    allocating a first IP address to the subscriber from a pool of IP addresses at the wireless access gateway, wherein the IP address facilitates a limited network connectivity between the subscriber and the wireless access gateway so that the wireless access gateway can authenticate the subscriber;
    receiving a request for a network service from the subscriber;
    assigning a second IP address to the subscriber from a second pool of IP addresses at the wireless access gateway in response to the request for the network service so that the subscriber can access the network service, thereby using IP addresses from the first pool of IP addresses for authentication, and reserving IP addresses in the second pool of IP addresses only for devices that actually request one or more network services;
    determining that the subscriber does not request a network service within a first limited duration, wherein the first limited duration is configurable for the first IP address;
    returning the first IP address to the first pool of IP addresses at the wireless gateway;
    determining that the subscriber has not request a network service within a second limited duration, wherein the second limited duration is configurable for the second IP address; and
    returning the second IP address to the second pool of IP addresses at the wireless access gateway;
    sending an authentication request message to an authentication, authorization and accounting server;
    receiving an authentication access message from the authentication, authorization and accounting server.

2. The computerized method of claim 1, wherein the first pool of IP addresses contains private IP addresses and the second pool of IP addresses contains pubic IP addresses.

3. The computerized method of claim 1, further comprising authenticating and authorizing the subscriber before assigning the second IP address.

4. The computerized method of claim 3, further comprising authenticating the subscriber based on a Media Access Control (MAC) address of the subscriber.

5. The computerized method of claim 3, wherein the authenticating and authorizing is based on Remote Access Dial In User Service (RADIUS) protocol with an authentication, authorization and accounting server.

6. The computerized method of claim 1, further comprising generating a subscriber context for the subscriber at the wireless access gateway.

7. The computerized method of claim 1, further comprising translating in data packets originated from and destined to the subscriber between the first and second IP addresses of the subscriber.

8. The computerized method of claim 7, wherein the translating occurs only in head sections of the data packets.

9. The computerized method of claim 1, further comprising including a Media Access Control (MAC) address of the subscriber in the authentication request message to the authentication, authorization and accounting server.

10. The computerized method of claim 1, further comprising detecting a re-directing URL in the authentication access message from the authentication, authorization and accounting server.

11. The computerized method of claim 1, further comprising receiving a Change of Authorization (CoA) message from the authentication, authorization and accounting server.

12. A computing system configured to allocate a first IP address to a device that is used for authentication after the device requests a network connection, and only allocating a second IP address to the device that provides access to one or more network services after the device request a network service, so that IP addresses used to access network services can be reserved only for devices requesting one or more network services comprising:
  a memory that stores one or more modules; and
  processor configured to run the one or more modules stored in the memory that are configured to cause the processor to:
    maintain a first and a second pool of IP addresses;
    receive a request from a subscriber to connect to a network and to allocate a first IP address to the subscriber from the first pool of IP addresses, wherein the first IP address facilitates a limited network connectivity between the subscriber and the computing system so that the computing system can authenticate the subscriber;
  receive a request for a network service from the subscriber;
  assign a second IP address to the subscriber in response to the request for the network service so that the subscriber can access the network service, thereby using IP addresses from the first pool of IP addresses for authentication, and reserving IP addresses in the second pool of IP addresses only for devices that actually request one or more network services;
  determine that the subscriber does not request a network service within a first limited duration, wherein the first limited duration is configurable for the first IP address;
  return the first IP address to the first pool of IP addresses;
  determine that the subscriber has not request a network service within a second limited duration, wherein the second limited duration is configurable for the second IP address; and
  return the second IP address to the second pool of IP addresses;
  send an authentication request message to an authentication, authorization and accounting server;
  receive an authentication access message from the authentication, authorization and accounting server.

13. The computing system of claim 12, wherein the first pool of IP addresses contains private IP addresses and the second pool of IP addresses contains pubic IP addresses.

14. The computing system of claim 12, wherein the one or more modules are further configured to cause the processor to generate a subscriber context for the subscriber.

15. The computing system of claim 12, wherein the one or more modules are further configured to cause the processor to authenticate and authorize the subscriber before the second IP address is assigned to the subscriber.

16. The computing system of claim 15, further comprising the authentication, authorization, and accounting server connector configure to communicate with an AAA server.

17. The computing system of claim 12, wherein the one or more modules are further configured to cause the processor to process uplink and downlink traffic data from and to the subscriber in one or more GRE tunnels.

18. The computing system of claim 12, wherein the one or more modules are further configured to cause the processor to translate in data packets originated from and destined to the subscriber between the first and second IP addresses of the subscriber.

19. The computing system of claim 18, wherein the one or more modules are further configured to cause the processor to translate only head sections of the data packets.

20. A non-transitory computer readable medium having executable instructions to, when executed by a processor, cause the processor to:
  receive at a wireless gateway a request from a subscriber to connect to a network;
  allocate a first IP address to the subscriber from a pool of IP addresses at the wireless access gateway, wherein the IP address facilitates a limited network connectivity between the subscriber and the wireless access gateway so that the wireless access gateway can authenticate the subscriber;
  receive a request for a network service from the subscriber;
  assign a second IP address to the subscriber from a second pool of IP addresses at the wireless access gateway in response to the request for the network service so that the subscriber can access the network service, thereby using IP addresses from the first pool of IP addresses for authentication, and reserving IP addresses in the second pool of IP addresses only for devices that actually request one or more network services;
  determine that the subscriber does not request a network service within a first limited duration, wherein the first limited duration is configurable for the first IP address;
  return the first IP address to the first pool of IP addresses at the wireless gateway;
  determine that the subscriber has not request a network service within a second limited duration, wherein the second limited duration is configurable for the second IP address; and
  return the second IP address to the second pool of IP addresses at the wireless access gateway;
  send an authentication request message to an authentication, authorization and accounting server;
  receive an authentication access message from the authentication, authorization and accounting server.

21. The non-transitory computer readable medium of claim 20, wherein the executable instructions are further operable to, when executed by the processor, authenticate and authorize the subscriber before assigning the second IP address.

* * * * *

UNITED STATES PATENT AND TRADEMARK OFFICE
CERTIFICATE OF CORRECTION

PATENT NO. : 10,142,159 B2
APPLICATION NO. : 13/966629
DATED : November 27, 2018
INVENTOR(S) : Rajendar Duggal et al.

It is certified that error appears in the above-identified patent and that said Letters Patent is hereby corrected as shown below:

In the Claims

Please correct Claims 1, 12, 16 and 20 to read as:

1. A computerized method for allocating a first IP address to a device that is used for authentication after the device requests a network connection, and only allocating a second IP address to the device that provides access to one or more network services after the device requests a network service, so that IP addresses used to access network services can be reserved only for devices requesting one or more network services, comprising:
    receiving at a wireless access gateway a request from a subscriber to connect to a network;
    allocating a first IP address to the subscriber from a first pool of IP addresses at the wireless access gateway, wherein the first IP address facilitates a limited network connectivity between the subscriber and the wireless access gateway so that the wireless access gateway can authenticate the subscriber;
    receiving a request for a network service from the subscriber;
    assigning a second IP address to the subscriber from a second pool of IP addresses at the wireless access gateway in response to the request for the network service so that the subscriber can access the network service, thereby using IP addresses from the first pool of IP addresses for authentication, and reserving IP addresses in the second pool of IP addresses only for devices that actually request one or more network services;
    determining that the subscriber does not request a network service within a first limited duration, wherein the first limited duration is configurable for the first IP address;
    returning the first IP address to the first pool of IP addresses at the wireless access gateway;
    determining that the subscriber has not request a network service within a second limited duration, wherein the second limited duration is configurable for the second IP address; and
    returning the second IP address to the second pool of IP addresses at the wireless access gateway;

Signed and Sealed this
Second Day of June, 2020

Andrei Iancu
*Director of the United States Patent and Trademark Office* sending an authentication request message to an authentication, authorization and accounting server;

receiving an authentication access message from the authentication, authorization and accounting server.

12. A computing system configured to allocate a first IP address to a device that is used for authentication after the device requests a network connection, and only allocating a second IP address to the device that provides access to one or more network services after the device requests a network service, so that IP addresses used to access network services can be reserved only for devices requesting one or more network services, comprising:

a memory that stores one or more modules; and a processor configured to run the one or more modules stored in the memory that are configured to cause the processor to:

maintain a first and a second pool of IP addresses;

receive a request from a subscriber to connect to a network and to allocate a first IP address to the subscriber from the first pool of IP addresses, wherein the first IP address facilitates a limited network connectivity between the subscriber and the computing system so that the computing system can authenticate the subscriber;

receive a request for a network service from the subscriber;

assign a second IP address to the subscriber in response to the request for the network service so that the subscriber can access the network service, thereby using IP addresses from the first pool of IP addresses for authentication, and reserving IP addresses in the second pool of IP addresses only for devices that actually request one or more network services;

determine that the subscriber does not request a network service within a first limited duration, wherein the first limited duration is configurable for the first IP address;

return the first IP address to the first pool of IP addresses at the wireless access gateway;

determine that the subscriber has not request a network service within a second limited duration, wherein the second limited duration is configurable for the second IP address;

return the second IP address to the second pool of IP addresses;

send an authentication request message to an authentication, authorization and accounting server; and receive an authentication access message from the authentication, authorization and accounting server.

16. The computing system of claim 15, further comprising an authentication, authorization, and accounting server connector configured to communicate with an authentication, authorization, and accounting server.

20. A non-transitory computer readable medium having executable instructions operable to, when executed by a processor, cause the processor to:

receive at a wireless access gateway a request from a subscriber to connect to a network;

allocate a first IP address to the subscriber from a first pool of IP addresses at the wireless access gateway, wherein the first IP address facilitates a limited network connectivity between the subscriber and the wireless access gateway so that the wireless access gateway can authenticate the subscriber;

receive a request for a network service from the subscriber;

assign a second IP address to the subscriber from a second pool of IP addresses at the wireless access gateway in response to the request for the network service so that the subscriber can access the network service, thereby using IP addresses from the first pool of IP addresses for authentication, and reserving IP addresses in the second pool of IP addresses only for devices that actually request one or more network services;

determine that the subscriber does not request a network service within a first limited duration, wherein the first limited duration is configurable for the first IP address;

return the first IP address to the first pool of IP addresses at the wireless access gateway;

determine that the subscriber has not requested a network service within a second limited duration, wherein the second limited duration is configurable for the second IP address;

return the second IP address to the second pool of IP addresses at the wireless access gateway;

send an authentication request message to an authentication, authorization and accounting server; and receive an authentication access message from the authentication, authorization and accounting server.